Patented Apr. 26, 1938

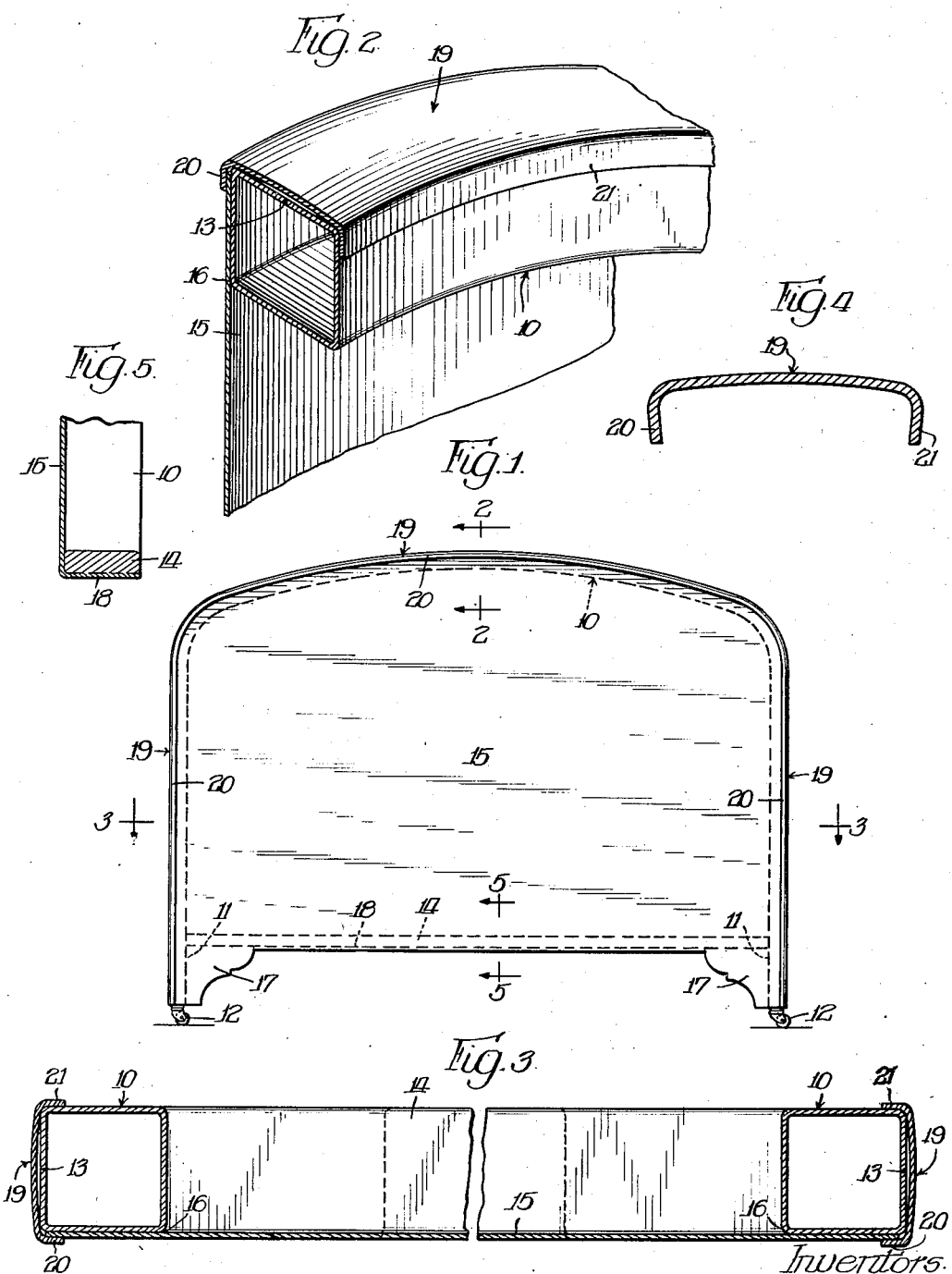

2,115,434

UNITED STATES PATENT OFFICE 2,115,434

BED END

Charles A. Stuart and John Hofbauer, Kenosha, Wis., assignors to Simmons Company, Kenosha, Wis., a corporation of Delaware Application August 20, 1936, Serial No. 96,920

4 Claims. (Cl. 5—280)

This invention relates to bed ends, and more particularly to bed ends of the panel type. Metal panel type beds have come into vogue during the past ten or fifteen years, but hitherto they have always been relatively expensive as compared with the older types of beds.

The object of the present invention has been to provide a panel type bed end that will be strong and rugged in construction, neat and ornamental in appearance, and that can be made much more cheaply than panel type bed ends have been made in the past.

An approved embodiment of the invention is illustrated in the accompanying drawing, in which:—

Fig. 1 is an elevation of the bed end, viewed from its outer side.

Fig. 2 is an enlarged fragmentary perspective view, in cross section, on the line 2—2 of Fig. 1.

Fig. 3 is a horizontal section on the line 3—3 of Fig. 1.

Fig. 4 is an enlarged cross section of the moulding strip.

Fig. 5 is an enlarged cross section on the line 5—5 of Fig. 1.

In the drawing, 10 designates as an entirety a tubular frame member of inverted U-shape, preferably of rectangular cross section as shown in Fig. 2, that conforms to the outline shape of the bed end and includes continuations of its side members to form the usual supporting legs 11 that receive the casters 12. This frame member is conveniently made from a sheet metal blank bent to the rectangular form shown, the two edges meeting and united at the joint 13 substantially midway of the outer limb. The legs 11 are rigidly connected and spaced by a cross bar 14 that is brazed at its ends to the legs.

15 designates as an entirety the panel, consisting of a flat sheet metal member suitably shaped to conform to the outline of the bed end, and tack welded or spot welded to the top and side portions of the frame 10 (including the legs 11) on one side of the frame along the line 16. The lower portion of the panel is preferably cut to form ornamental gussets 17, and the metal between the gussets is bent inwardly to form a flange 18 that underlies and is welded to the cross bar 14.

19 designates as an entirety a channel-shaped moulding strip that covers the outer sides of the top and side members of the frame 10. The side limb or flange 20 of this strip overlaps the edge portion of the panel 15 and is tack welded thereto, and the side limb or flange 21 similarly overlaps the opposite side limb of the frame 10 and is tack welded thereto. The moulding thus covers and conceals the raw edge of the panel and the joint between the latter and the frame member, as well as covering and concealing the joint 13, and also locks the joint 13 securely against spreading, making it unnecessary to solder or otherwise close the joint. By reference to Fig. 4 it will be observed that the intermediate portion of the moulding strip is formed with a low crown, and the two side limbs or flanges 20 and 21 are not exactly parallel but slightly inwardly convergent. As a result of this construction, when the moulding is forced over the frame member and panel it produces a tight fit at the free edges of the flanges 20 and 21. The moulding strip thus securely binds together the two opposite side limbs of the frame member against spreading and forms with the frame member and panel a strong, light and rigid construction.

The arching or crowning of the moulding strip 19 in association with its convergent flanges 20 and 21, has a helpful function in applying the moulding strip to the frame and panel, since inward pressure on the moulding strip temporarily flattens it, and thus slightly spreads the two flanges so that they can slide down over the walls which they embrace. When the pressure is released, the strip resumes its arched or crowned form and this causes the flanges to tightly grip and clamp the side walls.

Since all of the parts are capable of being made in suitable punch presses, the labor costs of the article are very low, enabling the structure to be produced and sold at a cost substantially below that of existing panel type beds.

We claim:

1. A panel type bed end, comprising a tubular frame member of rectangular cross section and having a joint extending longitudinally of its outer limb, a sheet metal panel attached at its edge portion to one side of said frame member, and a moulding strip covering the outer limb of said frame member and the adjacent edge of said panel and concealing the joint between said parts, said moulding strip having on one edge thereof a flange overlapping and attached to the edge portion of said panel, and on its opposite edge a flange overlapping and attached to a side limb of said frame member, whereby said moulding strip locks said outer limb against spreading at said joint.

2. A panel type bed end, comprising a tubular sheet metal frame member of rectangular cross section and having a longitudinal joint substantially midwidth of its outer limb, a flat sheet metal panel attached at its edge portion to the lower edge of one side of said frame member, and a sheet metal moulding strip covering the outer limb of said frame member and the adjacent edge of said panel, said moulding strip having convergent flanges on its opposite edges, one of said flanges overlapping and tack welded to the edge portion of said panel, and the other flange overlapping and tack welded to a side limb of said frame member.

3. A panel type bed end, comprising a hollow rectangular frame member, a sheet metal panel attached at its edge portion to one side of said frame member, and a channel-shaped sheet metal moulding strip covering the outer limb of said frame member and the adjacent edge of said panel, the side limbs of said strip being convergent and overlapping and attached respectively to the edge portion of said panel and to the opposite side limb of said frame member, and the intermediate portion of said strip being crowned.

4. A panel type bed end, comprising a hollow sheet metal frame member of rectangular cross section and having a joint extending longitudinally of its outer limb, a sheet metal panel attached at its edge portion to one side of said frame member, and a channel-shaped sheet metal moulding strip covering the outer limb of said frame member and the adjacent edge of said panel, the side limbs of said strip being inwardly convergent and overlapping and at their free edges attached respectively to the edge portion of said panel and to the opposite side of said frame member, and the intermediate portion of said strip being crowned.

CHARLES A. STUART.
JOHN HOFBAUER.